United States Patent
Furuta

(10) Patent No.: US 8,279,841 B2
(45) Date of Patent: Oct. 2, 2012

(54) MOBILE STATION AND DATA TRANSMISSION METHOD

(75) Inventor: Daitarou Furuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/369,910

(22) Filed: Feb. 12, 2009

(65) Prior Publication Data

US 2009/0310579 A1 Dec. 17, 2009

(30) Foreign Application Priority Data

Jun. 16, 2008 (JP) ................................ 2008-156787

(51) Int. Cl.
*H04W 4/00* (2009.01)
(52) U.S. Cl. ...................................... 370/338; 370/444
(58) Field of Classification Search .......... 370/328–329, 370/335–338, 389, 392, 395.4, 395.41–395.43, 370/400–401; 455/450–451, 452.1–452.2
See application file for complete search history.

(56) References Cited

U.S. PATENT DOCUMENTS

| | | | |
|---|---|---|---|
| 6,553,006 B1 * | 4/2003 | Kalliokulju et al. ........... | 370/310 |
| 6,671,511 B1 * | 12/2003 | Forssell et al. ............... | 455/452.1 |
| 6,684,081 B2 * | 1/2004 | Sarkkinen et al. ............ | 455/515 |
| 7,006,472 B1 | 2/2006 | Immonen et al. | |
| 7,054,268 B1 * | 5/2006 | Parantainen et al. ......... | 370/231 |
| 7,525,925 B2 * | 4/2009 | Muthiah ....................... | 370/252 |
| 7,555,010 B2 * | 6/2009 | Chun et al. .................... | 370/469 |
| 2002/0054578 A1 * | 5/2002 | Zhang et al. .................. | 370/328 |
| 2006/0079200 A1 | 4/2006 | Hirouchi et al. | |
| 2006/0140115 A1 * | 6/2006 | Timus et al. .................. | 370/230 |
| 2007/0081455 A1 | 4/2007 | Kashima et al. | |
| 2007/0121542 A1 * | 5/2007 | Lohr et al. ..................... | 370/329 |
| 2008/0090583 A1 * | 4/2008 | Wang et al. ................... | 455/452.1 |
| 2008/0279139 A1 * | 11/2008 | Beziot et al. .................. | 370/329 |
| 2009/0016282 A1 * | 1/2009 | Gasparroni et al. .......... | 370/329 |
| 2009/0046641 A1 * | 2/2009 | Wang et al. ................... | 370/329 |
| 2009/0201875 A1 * | 8/2009 | Hasegawa et al. ............ | 370/329 |
| 2009/0232083 A1 * | 9/2009 | Chun et al. .................... | 370/329 |
| 2009/0252107 A1 * | 10/2009 | Chun et al. .................... | 370/329 |

FOREIGN PATENT DOCUMENTS

| | | |
|---|---|---|
| JP | 2006-229668 | 8/2006 |
| WO | 2005/004076 | 1/2005 |

OTHER PUBLICATIONS

European Search Report and Annex to the European Search Report, dated Oct. 30, 2009 from corresponding European Application EP 09 15 2922.

Hiroshi Kawakami, et al., "Moving network support and QoS control for UMTS networks", May 1, 2005, Electronics & Communications in Japan, pp. 28-38, vol. 88. No. 5, Part 1, Wiley Periodicals, Inc., Hoboken, NJ, US.

Korean Notice of Preliminary Rejection dated Feb. 8, 2011, from corresponding Korean Application No. 10-2009-16666.

Chinese Office Action dated Jun. 16, 2011, from corresponding Chinese Application No. 200910118538.1.

\* cited by examiner

*Primary Examiner* — Chi H. Pham
*Assistant Examiner* — Kevin Mew
(74) *Attorney, Agent, or Firm* — Katten Muchin Rosenman LLP

(57) ABSTRACT

In a mobile station UE1, a service-type information detection unit 41 for detecting service-type information contained in the header of a packet in which transmit data is carried is provided at a radio link control layer 37 or a packet data convergence protocol sublayer 38.

3 Claims, 15 Drawing Sheets

FIG.8

| BEARER ID | FIFO NUMBER |
|---|---|
| 27 | 3 |
| 50 | 4 |
| 7 | 5 |
| | |
| | |

FIG.9

| BEARER ID | PRIORITY (1~8) |
|---|---|
| 27 | 8 |
| 50 | 1 |
| 7 | 4 |
| | |
| | |

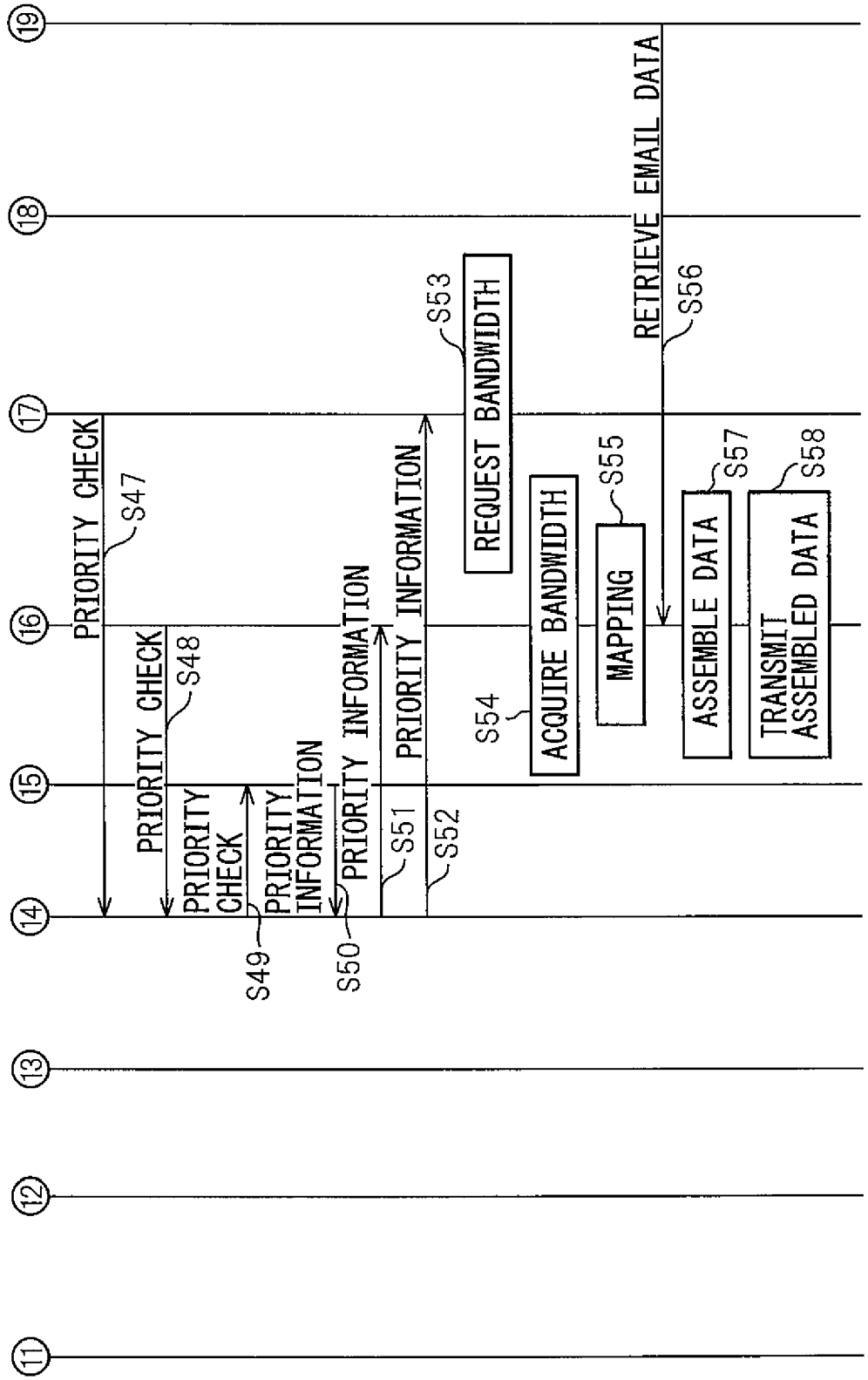

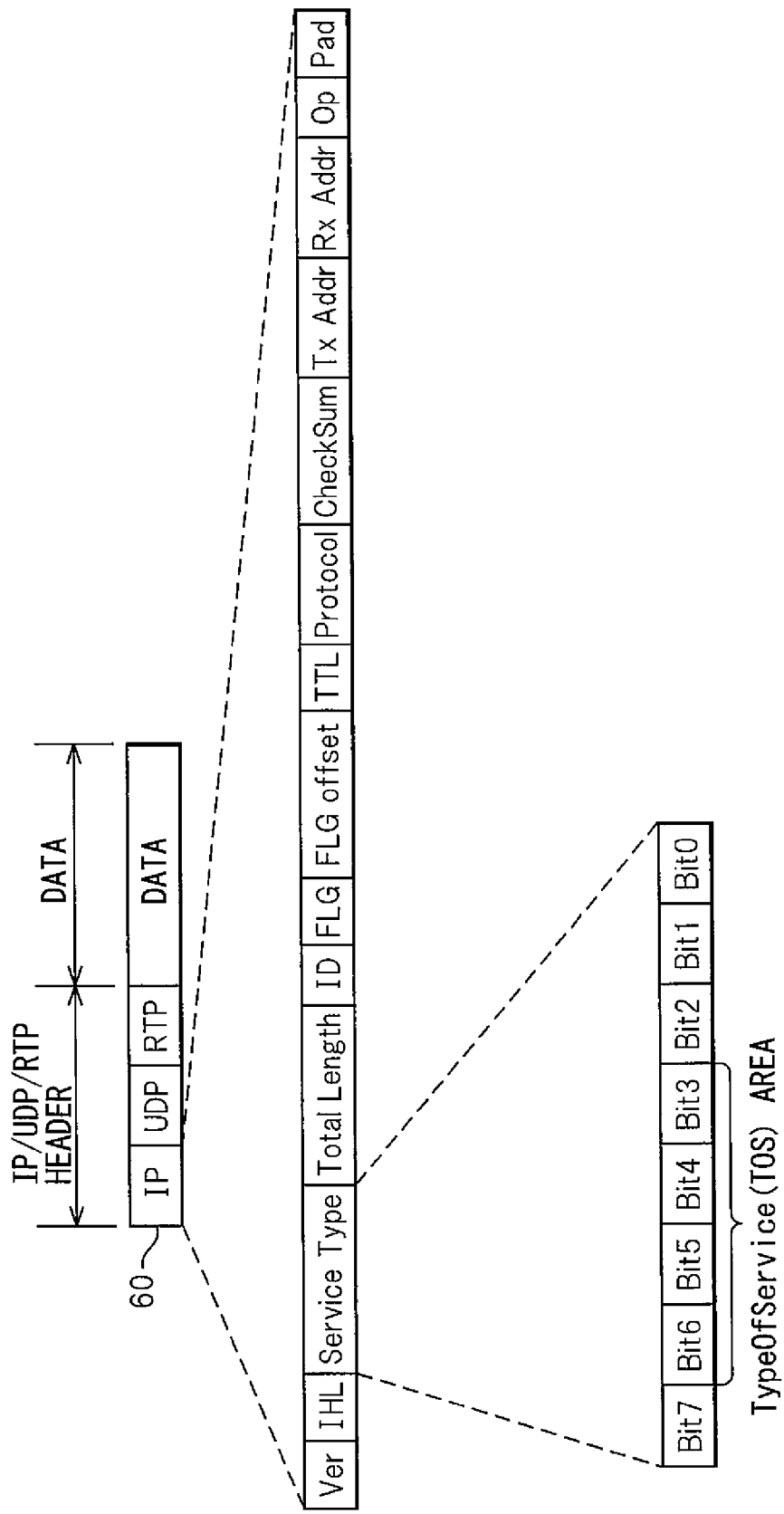

FIG.14A

| PRIORITY (1~8) | TOS |
|---|---|
| 1 | 0x06(Email) |
| 2 | 0x08 |
| 3 | 0x04 |
| 4 | 0x02 |
| 5 | 0x01 |
| 6 | 0x00 |
| 7 | 0x0a(SIP message) |
| 8 | 0x0c(VoIP) |

FIG.14B

| BEARER ID | TOS |
|---|---|
| 27 | 0x06 |
| 50 | 0x0c |
| 7 | 0x0a |
|  |  |
|  |  |
|  |  |

MOBILE STATION AND DATA TRANSMISSION METHOD

CROSS-REFERENCE TO RELATED APPLICATIONS

This application is based upon and claims the benefit of priority of the prior Japanese Patent Application No. 2008-156787, filed on Jun. 16, 2008, the entire contents of which are incorporated herein by reference.

FIELD

This application relates to a mobile station which transmits data to a base station by assembling the data into an Internet protocol packet, and a method for transmitting data from such a mobile station to a base station.

BACKGROUND

FIG. 1 is a diagram schematically depicting the configuration of a communication system in which VoIP technology is introduced, i.e., a communication system in which voice data is transmitted using Internet protocols over a wireless access portion which corresponds to a link connecting between a mobile station and a base station. The communication system 1 includes mobile terminals UE1 to UE5, base stations BS1 and BS2, an access gateway ND (aGW) as an upper level node than the base stations BS1 and BS2, and a core network NT.

In the example depicted in FIG. 1, the base station BS1 covers an area A1, and is connected via logical channels to the mobile terminals UE1 to UE3 located within the area A1. On the other hand, the base station BS2 covers an area A2, and is connected via logical channels to the mobile terminals UE4 and UE5 located within the area A2.

Traditionally, priority control has been performed in the wireless access portion when allocating uplink bandwidth at the media access control (MAC) layer. In this priority control, time-sensitive data such as VoIP data is transmitted with relatively high priority, while less time-sensitive data such as email data is transmitted with relatively low priority.

For example, in the mobile terminal UE3 depicted in FIG. 1, when email data and VoIP data are input from an application layer 16 to a radio link control (RLC) layer 15 via application interfaces API#0 and API#1, respectively, the MAC layer 14 transmits the data to the base station BS1 by assigning higher priority to the VoIP data than the email data in accordance with the priority predetermined by the communication provider.

On the other hand, in the mobile terminal UE2, email data and Internet data are input from an application layer 13 to an RLC layer 12 via application interfaces API#0 and API#1, respectively. Since both the email data and the Internet data are low priority data, the MAC layer 11 of the mobile terminal UE2 requests uplink bandwidth with relatively low priority from the base station BS1. As a result, if the MAC layer 11 of the mobile terminal UE2 tries to transmit the email data preferentially, the bandwidth is preferentially allocated to the VoIP data of the other mobile terminal UE3 because the bandwidth allocation priority of the email data is lower than that of the VoIP data.

International Publication Pamphlet No. WO 2005/4076 discloses a configuration in which, in the event of a disaster, the bandwidth control apparatus preferentially assigns packet call bandwidth.

On the other hand, Japanese Laid-open Patent Publication No. 2006-229668 discloses a method that, in the event of a disaster, prompts users to use email when inquiring about the safety of their relatives.

SUMMARY

According to the apparatus and method disclosed herein, service-type information contained in the header of a packet in which transmit data is carried is detected at the RLC layer or the packet data convergence protocol (PDCP) sublayer of a mobile station.

According to the apparatus and method disclosed herein, service-type information is set in the header of a packet in which transmit data is carried, in such a manner as to correspond with an application that generated the transmit data; the service type information thus set in the header of the packet is detected; and radio resource allocation priority is determined for each of uplink channels in accordance with the service type information that a service-type information detection unit detected from the transmit data on each of the uplink channels.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

The present invention will be more clearly understood from the description as set below with reference to the accompanying drawings, wherein:

FIG. 8 is a diagram depicting a mapping table of bearer IDs and FIFO numbers;

FIG. 9 is a diagram depicting a mapping table of bearer IDs and priorities;

FIG. 12 is a diagram (part 2) depicting the sequence of operations to be carried out in an emergency situation in the mobile terminal disclosed herein;

FIG. 13 is a diagram depicting the format of an SDU at a PDCP layer;

FIG. 14A is a diagram depicting a mapping table of TOS information and priorities;

FIG. 14B is a diagram depicting a mapping table of bearer IDs and TOS information;

DESCRIPTION OF EMBODIMENT(S)

In the event of an emergency or a disaster, email communication is advantageous because, compared with other types of communication means, email can be transmitted over a wireless link more reliably and does not require real time transmission. However, traditionally, priority has been predetermined for each service type by the communication provider and, whether in an emergency or not, the radio resource control (RRC) layer of each mobile terminal has had to use the priority fixedly determined for each service type in accordance with the policy predetermined by the communication provider. As a result, in the event of an emergency or a disaster, many mobile terminals attempt to connect to a base station at the same time, the radio bandwidth becomes saturated because of the transmission/reception scheduling of VoIP data, making it difficult to transmit low priority email data.

Figure 1:
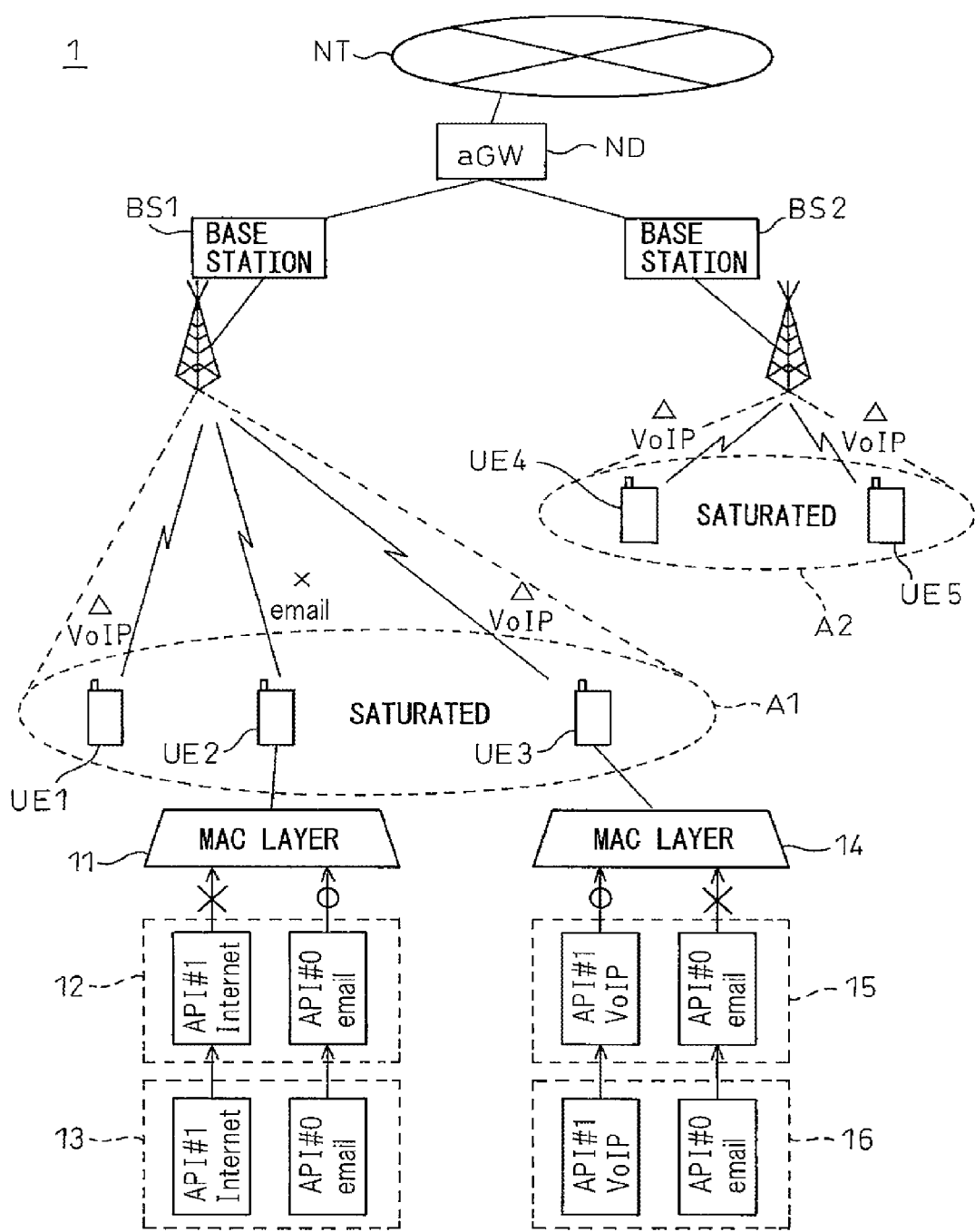
FIG. 1 is a diagram schematically depicting the configuration of a prior art communication system in which VoIP technology is introduced.
Figure 2:
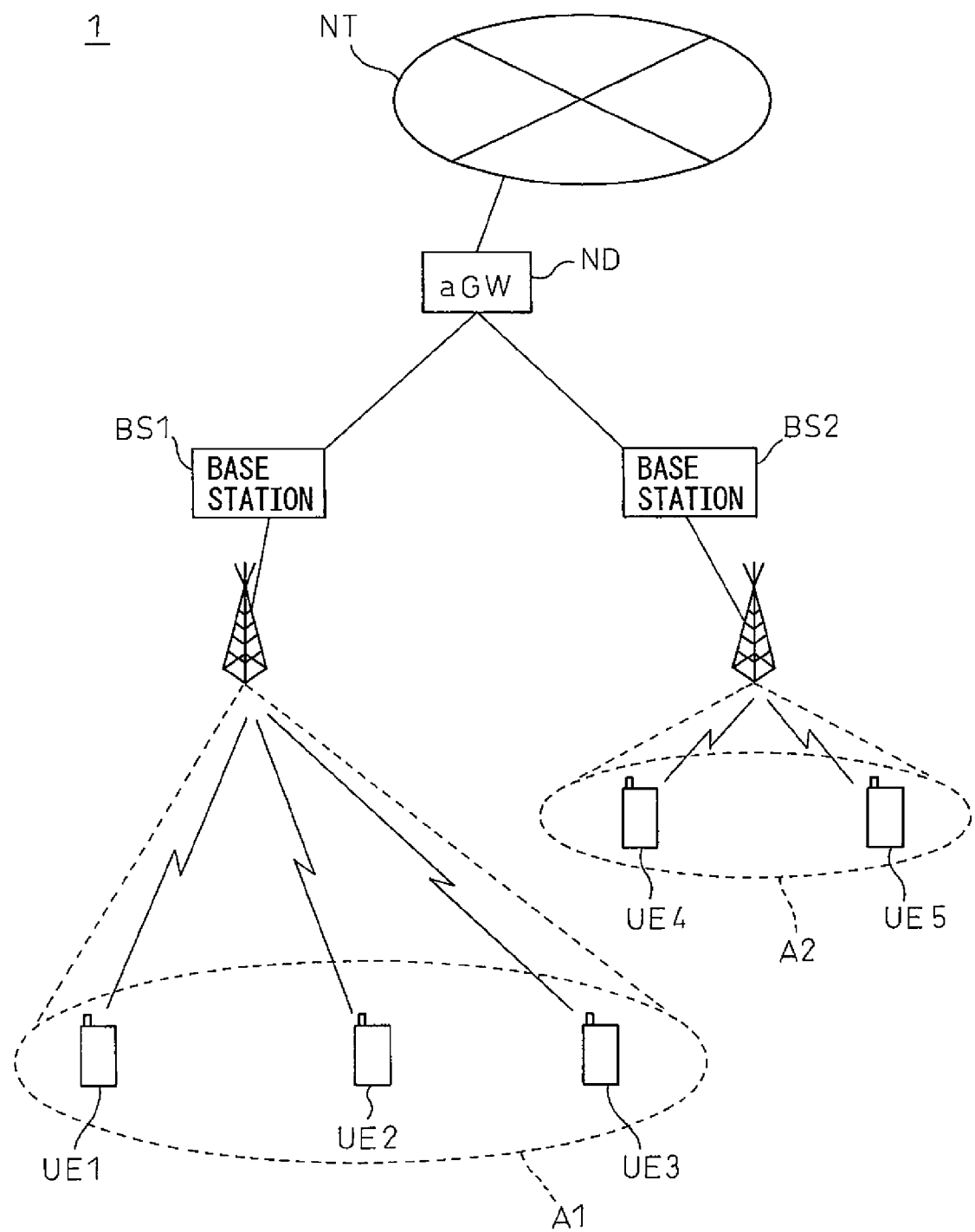
FIG. 2 is a diagram schematically depicting the configuration of an embodiment of a communication system disclosed herein.

The embodiments will be described below with reference to the accompanying drawings. FIG. 2 is a diagram schematically depicting the configuration of an embodiment of a communication system disclosed herein. The communication system 1 disclosed herein includes mobile terminals UE1 to UE5, base stations BS1 and BS2, an access gateway ND (aGW) as an upper level node than the base stations BS1 and BS2, and a core network NT.

In the example depicted in FIG. 2, the base station BS1 covers an area A1, while the base station BS2 covers an area A2. FIG. 2 depicts the condition in which logical channels are established between the base station BS1 and the mobile terminals UE1 to UE3 located within the area A1 and between the base station BS2 and the mobile terminals UE4 and UE5 located within the area A2.

Figure 3:
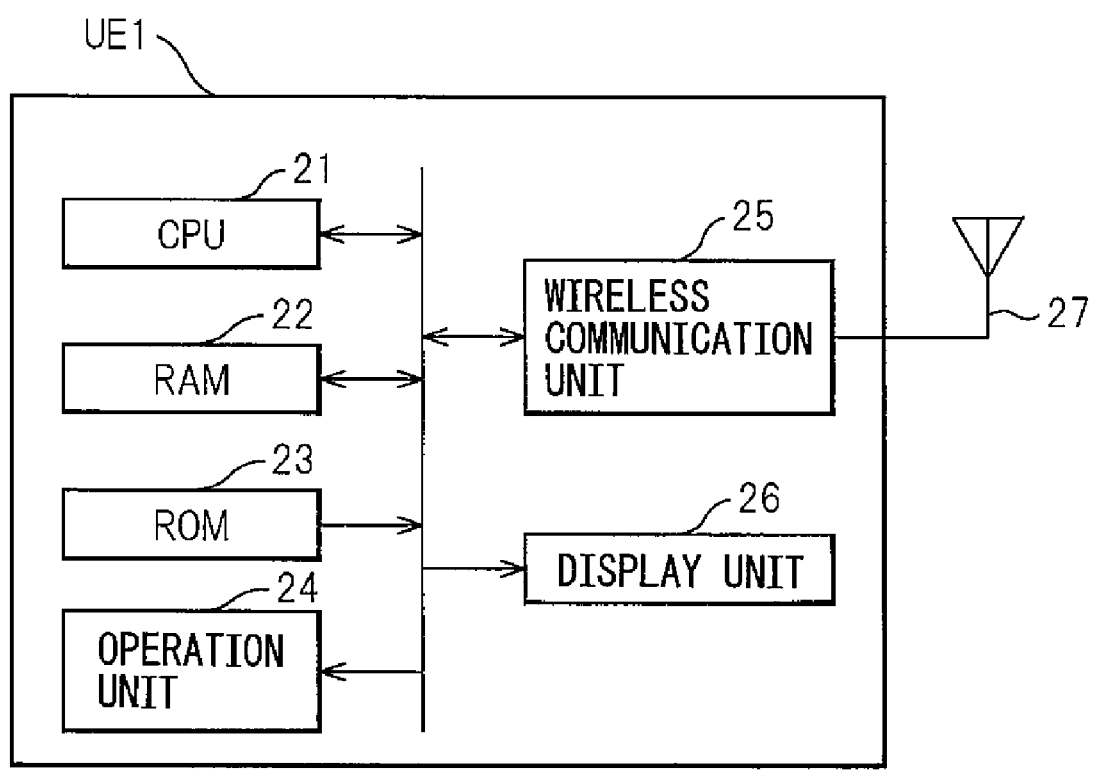
FIG. 3 is a diagram depicting a hardware configuration example of a mobile terminal disclosed herein.

FIG. 3 is a diagram depicting a hardware configuration example of the mobile terminal UE1 depicted in FIG. 2. The mobile terminals UE2 to UE5 have the same configuration. The mobile terminal UE1 includes a central processing unit (CPU) 21, a RAM 22, a ROM 23, an operation unit 24, a wireless communication unit 25, a display unit 26, and an antenna 27. With these component elements operating, the various functions of the mobile terminal UE1 described hereinafter are implemented.

Figure 4:
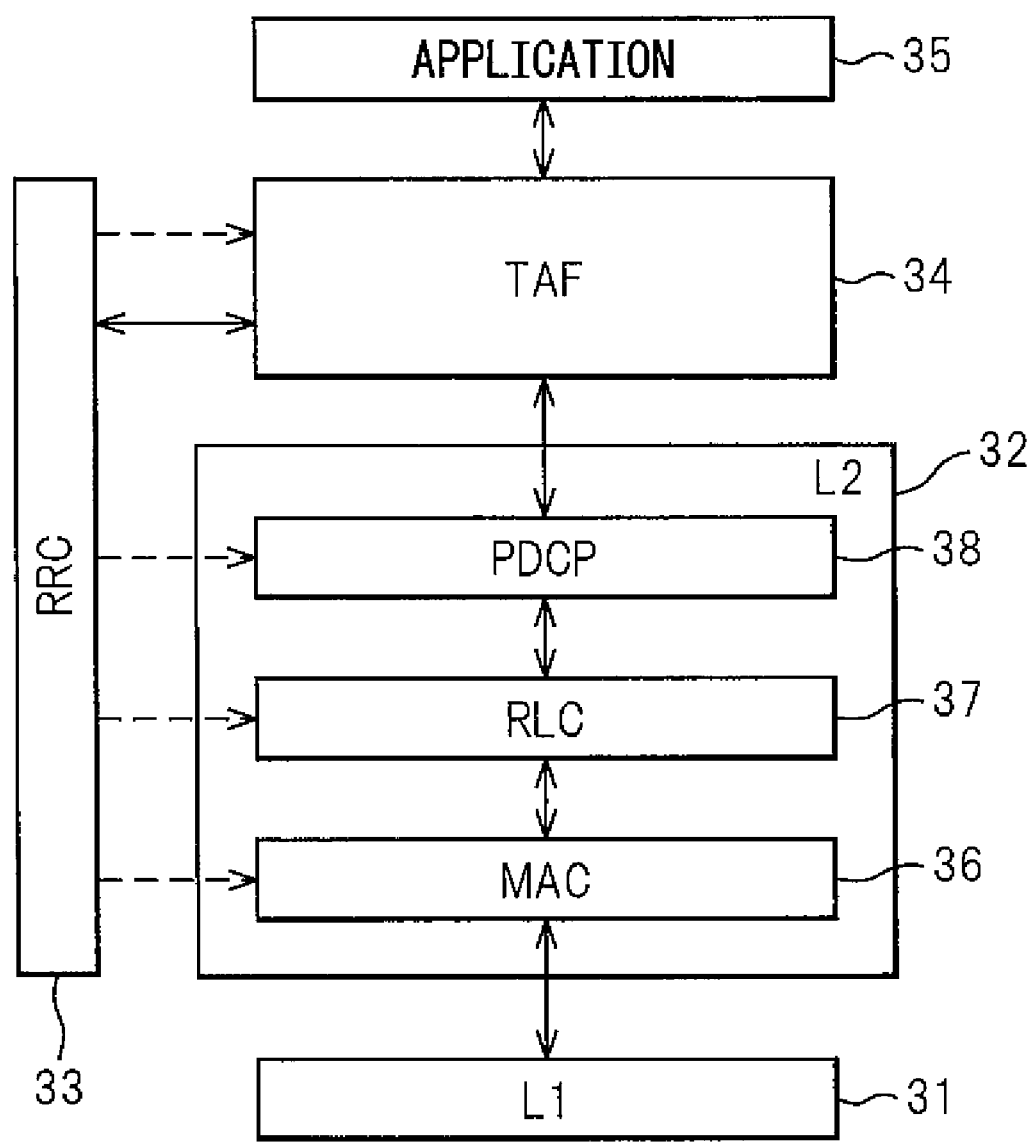
FIG. 4 is a diagram depicting the layer structure of a radio communication protocol used in the mobile terminal disclosed herein.

FIG. 4 is a diagram depicting the layer structure of the radio communication protocol used in the mobile terminal UE1. The mobile terminal UE1 includes a layer 1 (L1) 32, a layer 2 (L2) 32, an RRC layer 33, a TAF (Terminal Adapter Function) 34, and an application 35.

L1 is responsible for the transmission and reception of data via physical wireless communication, reception level measurement, and synchronization detection.

L2 is responsible for the transfer of data via a logical channel. L2 includes a MAC layer 36, an RLC layer 37, and a PDCP sublayer 38.

The MAC layer 36 is located between L1 and the RLC layer 37, accepts a protocol data unit (PDU) from the upper layer, and performs processing for PDU mapping to each channel and concealment.

The RLC layer 37 is a layer that generates a PDU, i.e., packetized data, from a service data unit (SDU) received as transmit data from the upper layer. Further, the RLC layer 37 accepts received data from the lower layer, assembles it into an SDU, and passes it to the upper layer. The RLC layer 37 has a storing means, for example, a FIFO memory, that stores the SDU received as transmit data from the upper layer.

The PDCP sublayer 38 is a layer provided for the purpose of compressing the header information added to the packet data and managing packet sequencing.

RRC 33, which is located above L2, is responsible for radio resource control, call control, mobility management, etc. Under instructions from the upper layer, RRC 33 passes the SDU as transmit data to the PDCP sublayer 38. The RRC layer 33 has such functions as radio bearer setting and the transfer of system information and paging information from the network to the mobile terminals UEs, and controls L1 and L2 necessary for such functions.

TAF 34, which is located above RRC 33, accepts an instruction from the application 35 and instructs the lower layer RRC 33 accordingly. The application 35 is, for example, an email program, a VoIP program, a user interface, or the like, and handles user data.

Figure 5:
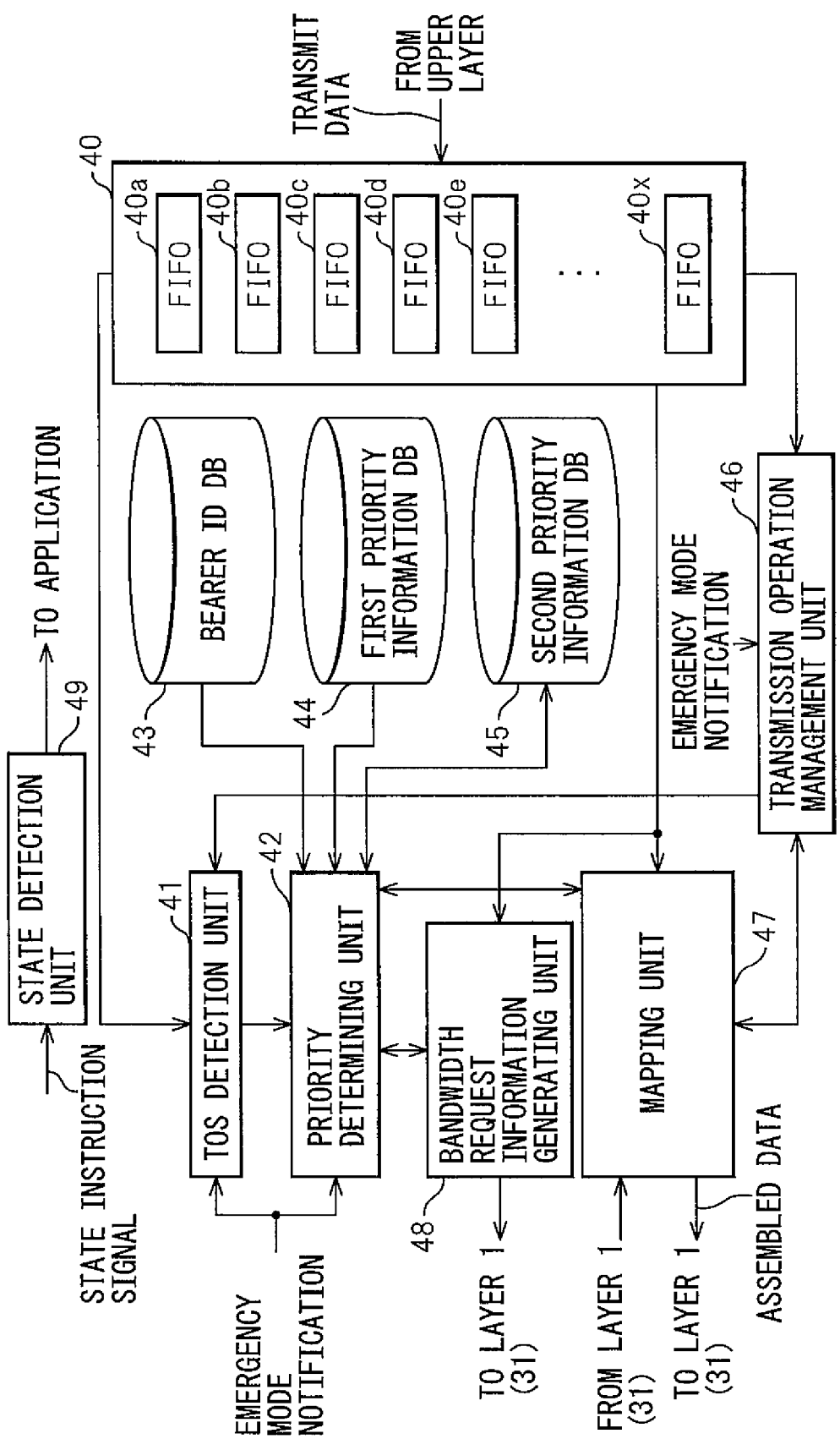
FIG. 5 is a diagram schematically depicting the functional configuration of the mobile terminal disclosed herein.

FIG. 5 is a diagram schematically depicting the functional configuration of the mobile terminal UE1 disclosed herein. The mobile terminal UE1 includes a transmit data storing unit 40, a TOS detection unit 41, a priority determining unit 42, a bearer ID database 43, a first priority information database 44, a second priority information database DB 45, a transmission operation management unit 46, a mapping unit 47, a bandwidth request information generating unit 48, and a state detection unit 49.

The transmit data storing unit 40 is provided at the RLC layer 37, and is capable of storing SDUs passed down from the upper layer (RRC 33). In the present embodiment, the transmit data storing unit 40 includes a plurality of FIFO memories 40a, . . . , 40x, one for each logical channel, to store the SDU passed down from the upper layer. Hereinafter, the FIFO memories 40a to 40e may sometimes be referred to as the first to fifth FIFO memories.

The TOS detection unit 41 is provided at the PDCP sublayer 38 or the RLC layer 37.

The TOS detection unit 41 detects, for each logical channel, i.e., for each bearer ID, the bit information contained in the TOS (Type Of Service) area of the service type field in the IP header of the packet data carried on the logical channel and input to and/or stored in the transmit data storing unit 40. In the description given hereinafter, the bit information contained in the TOS area of the service type field in the IP header will be referred to as the "TOS information."

The priority determining unit 42 is provided at the RLC layer 37, and registers the TOS information, detected for each logical channel by the TOS detection unit 41, into the second priority information database DB 45. Further, the priority determining unit 42 determines the transmission priority of each PDU in accordance with the bearer ID of the logical channel that transmits the PDU.

The bearer ID database 43 is provided at the RLC layer 37, and stores table data that maps the bearer ID of each logical channel to the number of the FIFO memory in which the PDU of that logical channel is stored.

The first priority information database 44 and the second priority information database 45 are both provided at the RLC layer 37. The first priority information database 44 and the second priority information database 45 each store priority determining information that determines the transmission priority of each PDU in accordance with the bearer ID of the logical channel that transmits the PDU. The second priority information database 45 is a database for storing priorities to be used in an emergency situation such as a disaster, while the first priority information database 44 is a database for storing priorities to be used in a normal situation.

The priority determining unit 42 selects the database used to determine the priority of each PDU between the two databases 44 and 45 according to whether the current situation is a normal or an emergency situation, as will be described later.

The transmission operation management unit 46 is provided at the RLC layer 37, and controls the transmission operation of the RLC layer 37 for transmitting uplink transmit data.

The mapping unit 47 is provided at the MAC layer 36, and maps each PDU transmitted from the RLC layer 37 onto the uplink radio bandwidth in accordance with the priority determined for each bearer ID by the priority determining unit 42.

The bandwidth request information generating unit 48 is provided at the MAC layer 36, and generates bandwidth request information for requesting an uplink bandwidth from the base station in accordance with the amount of data stored for each logical channel in the transmit data storing unit 40. The function of the bandwidth request information generating unit 48 may be incorporated into the mapping unit 47.

The state detection unit 49 detects an emergency notification arriving from outside the mobile terminal UE1. For example, the state detection unit 49 is provided at the RLC layer 37, detects emergency information that the base station is broadcasting via a broadcast channel (BCH), and notifies the application 35 of the occurrence of an emergency situation.

Figure 6:
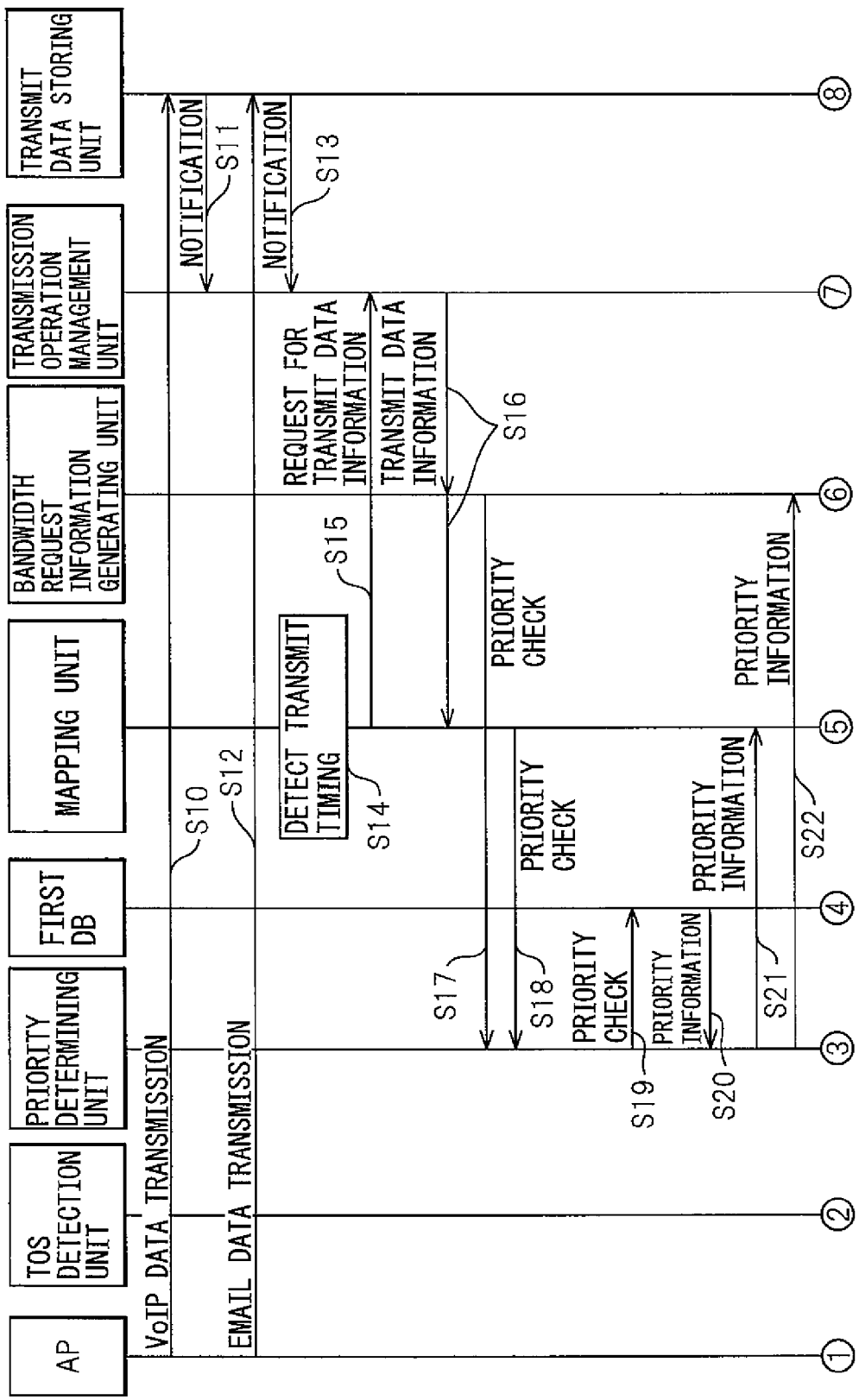
FIG. 6 is a diagram (part 1) depicting the sequence of operations to be carried out in a normal situation in the mobile terminal disclosed herein.
Figure 7:
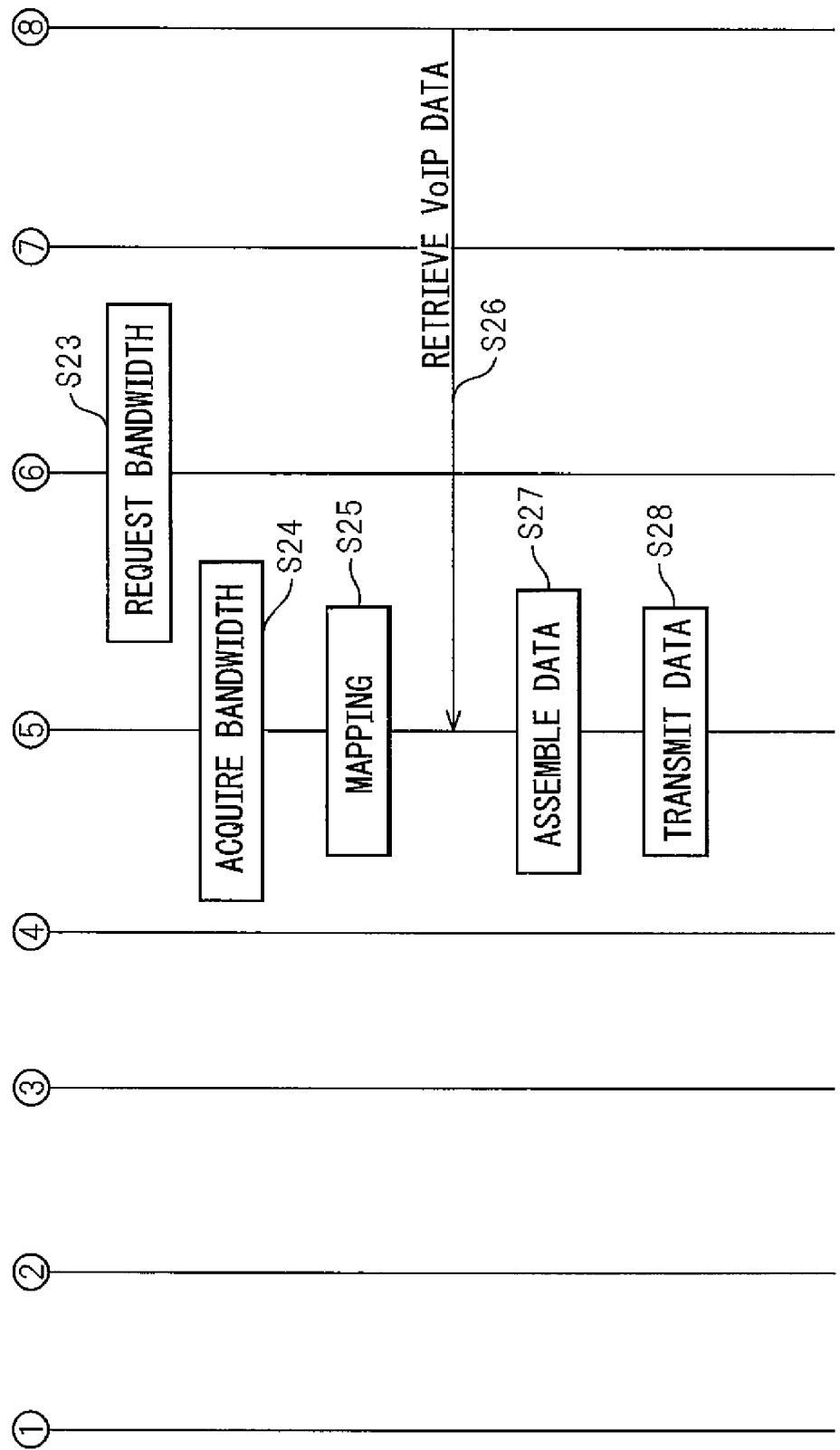
FIG. 7 is a diagram (part 2) depicting the sequence of operations to be carried out in a normal situation in the mobile terminal disclosed herein.

FIGS. 6 and 7 are diagrams depicting the sequence of operations to be carried out in a normal situation in the mobile terminal UE1.

In step S10, VoIP data generated by the application, which is, in this case, the VoIP program, is received by the transmit data storing unit 40.

Of the FIFO memories 40a to 40e, the transmit data storing unit 40 stores the VoIP data in the FIFO memory allocated by RRC 33 to the logical channel generated to transmit the VoIP data. The following description assumes that the VoIP data is stored in the fourth FIFO memory 40d and that the value of the bearer ID of the logical channel generated to transmit the VoIP data is "50."

In step S11, the transmit data storing unit 40 notifies the transmission operation management unit 46 of the reception of the VoIP data.

In step S12, email data generated by the application, which is, in this case, the email program, is received by the transmit data storing unit 40.

The transmit data storing unit 40 stores the email data in the FIFO memory allocated to the logical channel generated to transmit the email data. The following description assumes that the email data is stored in the third FIFO memory 40c and that the value of the bearer ID of the logical channel generated to transmit the email data is "27."

In step S13, the transmit data storing unit 40 notifies the transmission operation management unit 46 of the reception of the email data.

The mapping unit 47 periodically checks to see whether the transmit timing of uplink data has arrived or not. When the transmit timing is detected in step S14, the mapping unit 47 requests in step S15 to the transmission operation management unit 46 to deliver transmit data information that indicates the presence or absence of transmit data and the amount of the transmit data. In step S16, the transmission operation management unit 46 delivers the transmit data information to the mapping unit 47 and the bandwidth request information generating unit 48.

In steps S17 and S18, the bandwidth request information generating unit 48 and the mapping unit 47 respectively inquire the priority determining unit 42 about the priority of the VoIP data stored in the fourth FIFO memory 40d and the email data stored in the third FIFO memory 40c.

The priority determining unit 42 acquires from the bearer ID database 43 the values of the bearer IDs ("27" and "50," respectively) of the logical channels of the email data and VoIP data stored in the respective FIFO memories 40c and 40d. FIG. 8 depicts a mapping table of the bearer IDs and FIFO numbers stored in the bearer ID database 43. In the bearer ID database 43, the numbers of the FIFOs allocated by the RRC layer 33 to the respective logical channels when the logical channels are generated are stored in the form of a mapping table by associating them with the bearer IDs of the respective logical channels.

In the illustrated example, the third FIFO memory 40c is allocated to the logical channel whose bearer ID is "27," the fourth FIFO memory 40d is allocated to the logical channel whose bearer ID is "50," and the fifth FIFO memory 40e is allocated to the logical channel whose bearer ID is "7".

In step S19, the priority determining unit 42 sends the bearer ID "50" of the VoIP data and the bearer ID "27" of the email data to the first priority information database 44 to inquire about the transmission priorities of the respective data.

The first priority information database 44 stores priority determining information for determining the priority corresponding to the bearer ID of each data in a normal situation. The priority determining information stored in the first priority information database 44 is determined by the RRC layer 33, when generating the logical channels, for the service types of the data transmitted on the logical channels of the respective bearer IDs in accordance with the policy predetermined by the communication provider. FIG. 9 shows a mapping table of the bearer IDs and priorities as an example of the priority determining information stored in the first priority information database 44. The data transmission priority is set to "8," "1," and "4" for the bearer IDs "27," "50," and "7," respectively. Here, the priority "1" is the highest, and "8" is the lowest.

In step S20, the first priority information database 44 returns the values "8" and "1" to the priority determining unit 42 as the priorities corresponding to the respective bear IDs "27" and "50."

In steps S21 and S22, the priority determining unit 42 passes the priorities acquired from the first priority information database 44 on to the mapping unit 47 and the bandwidth request information generating unit 48, respectively.

In step S23, based on the transmit data information acquired in step S16 from the transmission operation management unit 46 and the priorities acquired in step S22 from the priority determining unit 42, the bandwidth request information generating unit 48 generates bandwidth request information 50 specifying the uplink bandwidth to request from the base station, and transmits it to the base station BS1 via the layer 1 (L1) 31.

In step S24, the mapping unit 47 acquires bandwidth acquisition information 51 indicating the uplink bandwidth allocated by the base station, and in step S25, maps the transmit data stored in the transmit data storing unit 40 onto the thus allocated bandwidth.

Figure 10:
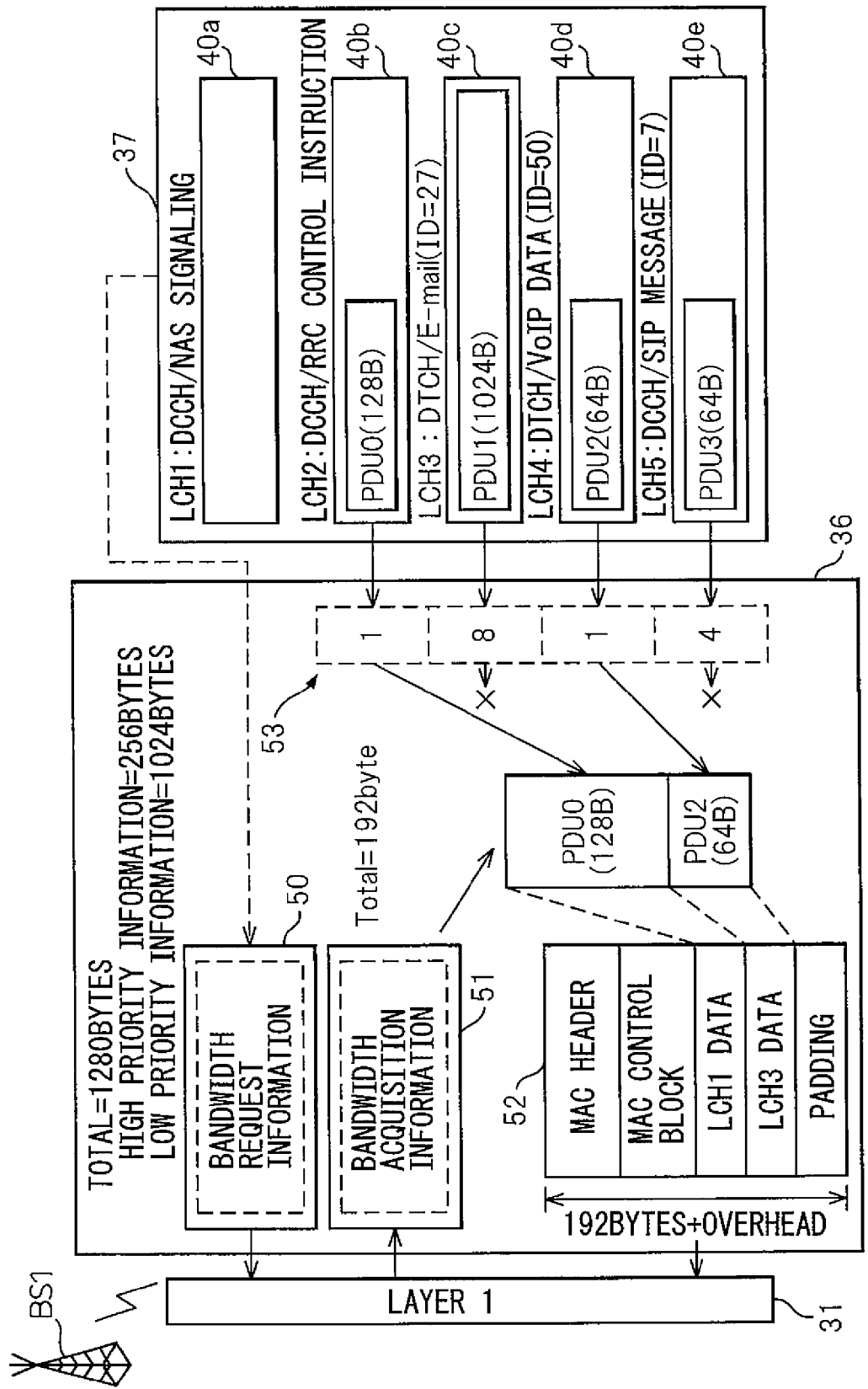
FIG. 10 is a diagram explaining the operation of the mobile terminal in a normal situation.

Referring to FIG. 10, a description will be given of how the mobile terminal UE1 requests and acquires the uplink bandwidth in a normal situation. As depicted in FIG. 10, the first FIFO memory 40a of the transmit data storing unit 40 is allocated for the transmission of NAS signaling data on DCCH, the second FIFO memory 40b is allocated for the transmission of an RRC control instruction on DCCH, the third FIFO memory 40c is allocated for the transmission of email data, the fourth FIFO memory 40d is allocated for the transmission of VoIP data, and the fifth FIFO memory 40e is allocated for the transmission of a SIP message on DCCH.

It is assumed that the bearer ID of the logical channel for transmitting the email data is "27," that the bearer ID of the logical channel for transmitting the VoIP data is "50," and that the bearer ID of the logical channel for transmitting the SIP message is "7," and the priorities preregistered for the respective bearer IDs in the first priority information database 44 applicable in a normal situation are as depicted in the mapping table of FIG. 9.

Currently, a 128-byte PDU 0 is stored in the second FIFO memory 40b, a 1024-byte PDU 1 is stored in the third FIFO memory 40c, a 64-byte PDU 2 is stored in the fourth FIFO memory 40d, and a 64-byte PDU 3 is stored in the fifth FIFO memory 40e.

In accordance with the mapping table of FIG. 9, the transmission priorities of the PDUs 1 to 3 stored in the third to fifth FIFO memories 40c to 40e are determined as "8," "1," and "4," respectively. The PDU 0 stored in the second FIFO memory 40b is control information to which transmission priority "1" is always assigned. The transmission priorities thus determined for the respective data stored in the second to fifth FIFO memories 40b to 40e are depicted at reference numeral 53.

Of the data stored in the second to fifth FIFO memories 40b to 40e, the bandwidth request information generating unit 48 treats the data of priorities "1" to "4" as high priority data, and calculates the sum of the data lengths of the data of priorities "1" to "4" (128+64+64=256 bytes). Further, the bandwidth request information generating unit 48 treats the data of priorities "5" to "8" as low priority data, and calculates the sum of the data lengths of the data of priorities "5" to "8" (1024 bytes).

The bandwidth request information generating unit 48 generates bandwidth request information 50 that specifies the total data length of the high priority information and the total data length of the low priority information as the uplink bandwidth to be requested. Here, the bandwidth request information generating unit 48 specifies the data length of the high priority information and the data length of the low priority information separately.

The base station BS1 that received the bandwidth request information 50 preferentially allocates the uplink bandwidth to the high priority information requested by each mobile terminal, and transmits the bandwidth acquisition information 51 indicating the thus allocated bandwidth to the requesting mobile terminal. The bandwidth acquisition information 51 is received by the mapping unit 47. In the example of FIG. 10, a total of 192 bytes are allocated as the PDU transmission bandwidth to the mobile terminal UE1.

Of the data stored in the second to fifth FIFO memories 40b to 40e, the mapping unit 47 preferentially maps the relatively high priority PDU 0 (RRC control instruction) and PDU 2 (VoIP data) stored in the second and fourth FIFO memories 40b and 40d. Here, since all the allocated bandwidth is used up, the PDU 1 (email data) and PDU 3 (SIP message) stored in the third and fifth FIFO memories 40c and 40e are not mapped.

In step S26 depicted in FIG. 7, the mapping unit 47 retrieves the preferentially mapped VoIP data from the transmit data storing unit 40, and in step S27, other information such as control information and a header or the like are added to the VoIP data (reference numeral 52 in FIG. 10). In step S28, the thus assembled data is transmitted via the layer 1 (31) to the base station BS1.

Figure 11:
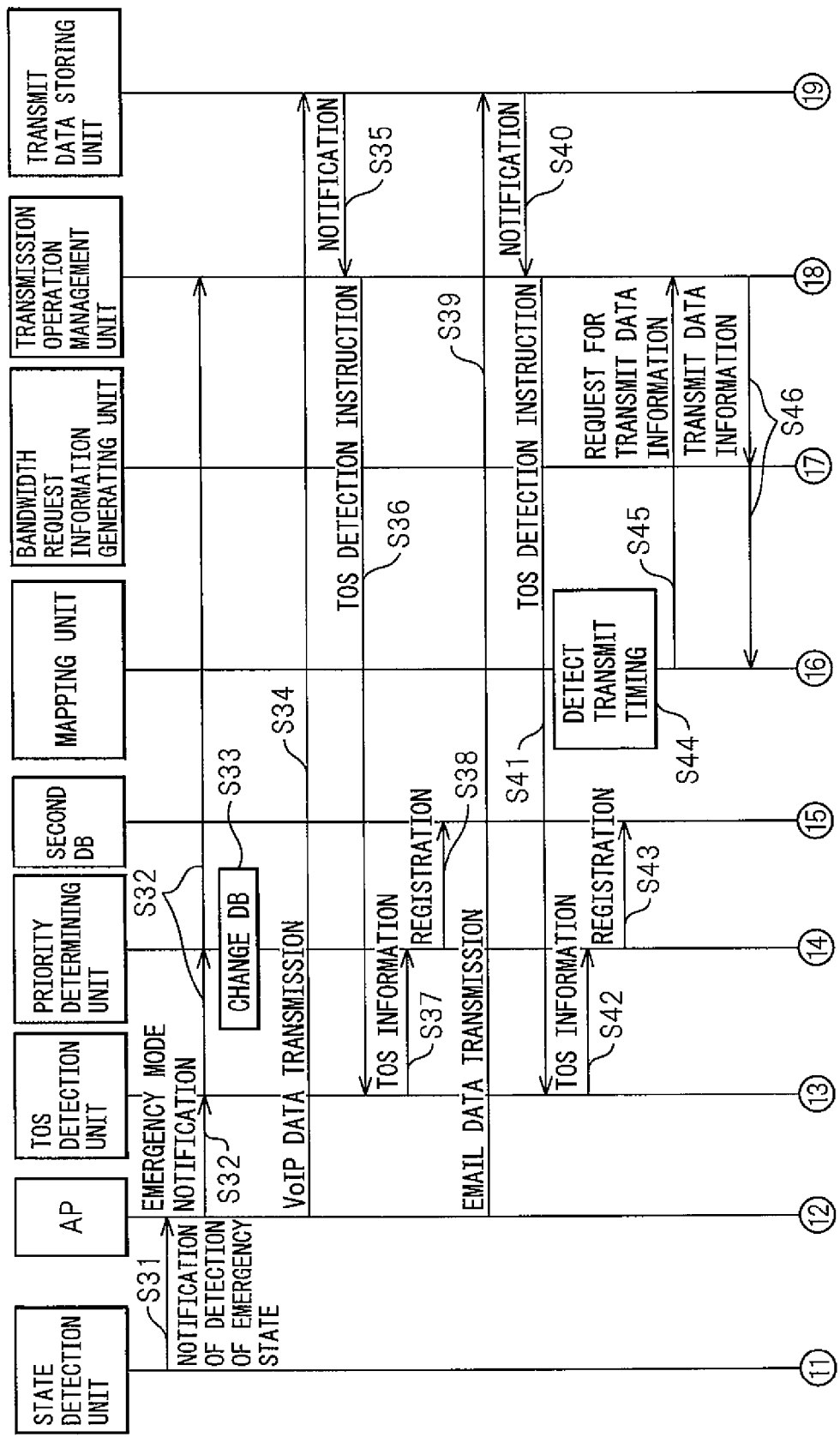
FIG. 11 is a diagram (part 1) depicting the sequence of operations to be carried out in an emergency situation in the mobile terminal disclosed herein.

FIGS. 11 and 12 are diagrams depicting the sequence of operations to be carried out in an emergency situation in the disclosed mobile terminal. Here, the bearer IDs of the various data such as the VoIP data and email data transmitted from the application 35 and the numbers of the FIFO memories for storing the respective data are the same as those described with reference to FIGS. 6 to 10 for the sequence of operations performed in a normal situation.

In step S31, the state detection unit 49 detects an emergency notification arriving from outside the mobile terminal UE1, and thereby detects that the communication system 1 in which the mobile terminal UE1 is operating has entered an emergency state represented by one of two predetermined states, the normal state and the emergency state. For example, the state detection unit 49 may detect the emergency information that the base station is broadcasting via a broadcast channel (BCH). The state detection unit 49 notifies the application 35 of the occurrence of an emergency situation.

In step S32, the application 35 performs emergency mode notification to notify the TOS detection unit 41, the priority determining unit 42, and the transmission operation management unit 46 that the communication system 1 has entered the emergency state. The application 35 may perform the emergency mode notification through the use of a semaphore or operating system message processing, or alternatively, the application 35 may notify the TOS detection unit 41 of the current state, the emergency state or the normal state, by setting or not setting the TOS information in the IP header of the transmit data, and the TOS detection unit 41 may notify the priority determining unit 42 and the transmission operation management unit 46 through the use of a semaphore or message processing.

In the above step S32, the application 35 has been described as performing the emergency mode notification to the TOS detection unit 41, the priority determining unit 42, and the transmission operation management unit 46, but instead, the emergency mode notification may be performed by the state detection unit 49 or by some other means notified of the occurrence of the emergency situation by the state detection unit 49.

In step S33, the priority determining unit 42 that received the emergency mode notification changes the database it uses to check the priority of the transmit data from the first priority information database 44 to the second priority information database 45.

In step S34, the VoIP data generated by the application, which is, in this case, the VoIP program, is received by the transmit data storing unit 40. When notified of the current state being the emergency state by the state detection unit 49, the application sets information concerning the service type into the TOS area of the service type field in the IP header of the PDU that contains the VoIP data and that is to be passed to the lower layer.

FIG. 13 is a diagram depicting the format of the SDU passed from the application down to the PDCP layer. As depicted, the IP header of the SDU 60 contains the service type field, and the service type information is set in the TOS area that occupies bits 3 to 6 of that field. It is assumed here that the service type information indicating the VoIP service is, for example, "0x0c."

Turning back to FIG. 11, the transmit data storing unit 40 stores the VoIP data in the fourth FIFO memory 40d allocated to the logical channel for the transmission of the VoIP data.

In step S35, the transmit data storing unit 40 notifies the transmission operation management unit 46 that the VoIP data has been received and stored in the fourth FIFO memory 40d.

When notified by the transmit data storing unit 40 that the VoIP data has been stored in the fourth FIFO memory 40d, the transmission operation management unit 46 that received the emergency mode notification instructs the TOS detection unit 41 to detect the TOS information stored in the IP header of the VoIP data stored in the fourth FIFO memory 40d.

In step S37, in accordance with the instruction from the transmission operation management unit 46, the TOS detection unit 41 detects the TOS information of the packet stored in the FIFO memory 40d, and reports it to the priority determining unit 42.

In step S38, the priority determining unit 42 acquires from the bearer ID database 43 the value of the bearer ID ("50") of the logical channel of the VoIP data stored in the FIFO memory 40d. Then, the priority determining unit 42 detects that the service type information indicating the service type of the packet whose bearer ID is "50" is "0x0c" reported in step S37 from the TOS detection unit 41, and registers it in the second priority information database 45.

FIGS. 14A and 14B are diagrams depicting an example of the second priority information stored in the second priority information database 45 for use in an emergency situation: FIG. 14A depicts a mapping table of the TOS information and priorities, and FIG. 14B depicts a mapping table of the bearer IDs and TOS information. As depicted in FIG. 14B, the bearer IDs of the data stored in the transmit data storing unit 40 are stored in the second priority information database 45 in the form of a table by associating them with the TOS information indicating the service types of the respective data.

In step S39, the email data generated by the application, which is, in this case, the email program, is received by the transmit data storing unit 40. The application sets, for example, "0x06" into the TOS area of the service type field in the IP header of the PDU that contains the email data and that is to be passed to the lower layer.

The transmit data storing unit 40 stores the email data in the third FIFO memory 40c allocated to the logical channel for the transmission of the email data.

In step S40, the transmit data storing unit 40 notifies the transmission operation management unit 46 that the email data has been received and stored in the third FIFO memory 40c.

In step S41, the transmission operation management unit 46 instructs the TOS detection unit 41 to detect the TOS information stored in the IP header of the email data stored in the third FIFO memory 40c.

In step S42, in accordance with the instruction from the transmission operation management unit 46, the TOS detection unit 41 detects the TOS information of the packet stored in the FIFO memory 40c, and reports it to the priority determining unit 42.

In step S43, the priority determining unit 42 acquires from the bearer ID database 43 the value of the bearer ID ("27") of the logical channel of the email data stored in the FIFO memory 40c. Then, the priority determining unit 42 detects that the service type information indicating the service type of the packet whose bearer ID is "27" is "0x06" reported in step S42 from the TOS detection unit 41, and registers it in the second priority information database 45. As depicted in FIG. 14B, the bearer ID "27" of the logical channel allocated for the transmission of the email data is stored in the second priority information database 45 in the form of a table by associating it with the TOS information "0x06" indicating the email service.

Turning back to FIG. 11, the mapping unit 47 periodically checks to see whether the transmit timing of uplink data has arrived or not. When the transmit timing is detected in step S44, the mapping unit 47 requests in step S45 to the transmission operation management unit 46 to deliver transmit data information. In step S46, the transmission operation management unit 46 delivers the transmit data information to the mapping unit 47 and the bandwidth request information generating unit 48.

In steps S47 and S48, the bandwidth request information generating unit 48 and the mapping unit 47 respectively inquire the priority determining unit 42 about the priority of the VoIP data stored in the fourth FIFO memory 40d and the email data stored in the third FIFO memory 40c.

The priority determining unit 42 acquires from the bearer ID database 43 the bearer IDs of the data stored in the respective FIFO memories 40c and 40d.

In step S49, the priority determining unit 42 sends the bearer ID "50" of the VoIP data and the bearer ID "27" of the email data to the second priority information database 45 to inquire about the transmission priorities of the respective data.

The second priority information database 45 stores priority determining information for determining the priority corresponding to the bearer ID of each data in an emergency situation. For this purpose, the second priority information database 45 maintains the mapping table of the TOS information and priorities depicted in FIG. 14A in addition to the mapping table of the bearer IDs and TOS information depicted in FIG. 14B. For example, priority "1" is assigned to the TOS information "0x06" indicating the email service, priority "8" is assigned to the TOS information "0x0c" indicating the VoIP service, and priority "7" is assigned to the TOS information "0x0a" indicating the SIP service.

In step S50, the second priority information database 45 acquires the TOS information "0x06" and "0x0c" corresponding to the respective bearer IDs "27" and "50" by referring to the mapping table of the bearer IDs and TOS information, and acquires the priorities "1" and "8" corresponding to the respective TOS information "0x06" and "0x0c" by referring to the mapping table of the TOS information and priorities.

The second priority information database 45 returns the values "1" and "8" to the priority determining unit 42 as the priorities corresponding to the respective bearer IDs "27" and "50."

In steps S51 and S52, the priority determining unit 42 passes the priorities acquired from the second priority information database 45 on to the mapping unit 47 and the bandwidth request information generating unit 48, respectively.

In step S53, based on the transmit data information acquired from the transmission operation management unit 46 and the priorities acquired from the priority determining unit 42, the bandwidth request information generating unit 48 generates bandwidth request information 50 specifying the uplink bandwidth to request from the base station, and transmits it to the base station BS1 via the layer 1 (L1) 31.

In step S54, the mapping unit 47 acquires bandwidth acquisition information 51 indicating the uplink bandwidth allocated by the base station, and in step S55, maps the transmit data stored in the transmit data storing unit 40 onto the thus allocated bandwidth.

Figure 15:
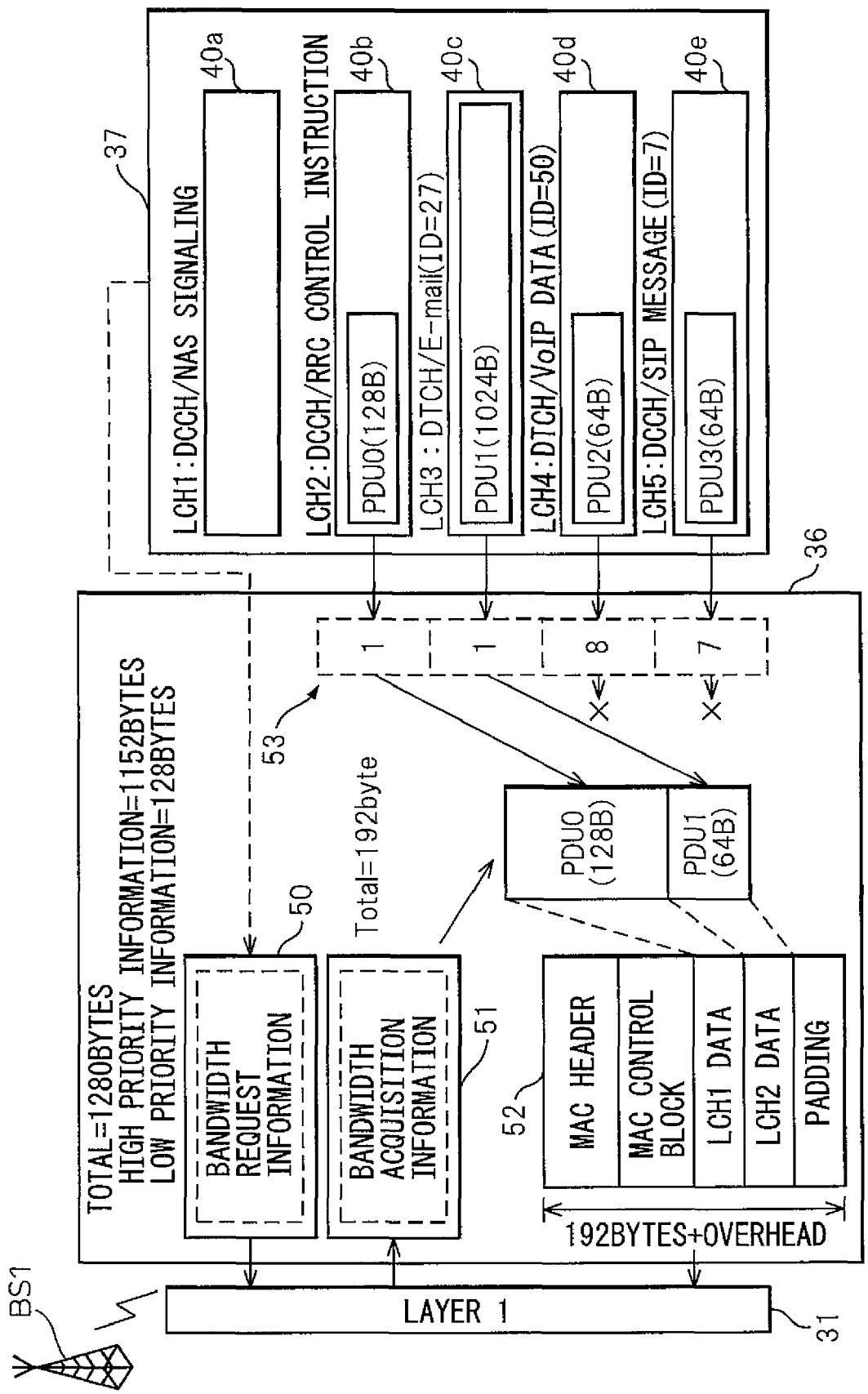
FIG. 15 is a diagram explaining the operation of the mobile terminal in an emergency situation.

Referring to FIG. 15, a description will be given of how the mobile terminal UE1 requests and acquires the uplink bandwidth in an emergency situation. In accordance with the priorities defined in the mapping tables of FIGS. 14A and 14B, the transmission priorities of the PDUs 1 to 3 stored in the third to fifth FIFO memories 40c to 40e are determined as "1," "8," and "7," respectively. The transmission priorities thus determined for the respective data stored in the second to fifth FIFO memories 40b to 40e are depicted at reference numeral 53.

As earlier described, the bandwidth request information generating unit 48 treats the data of priorities "1" to "4" as high priority data, and calculates the sum of the data lengths of the data of priorities "1" to "4" (128+1024=1152 bytes). Further, the bandwidth request information generating unit 48 treats the data of priorities "5" to "8" as low priority data, and calculates the sum of the data lengths of the data of priorities "5" to "8" (64+64=128).

The bandwidth request information generating unit 48 generates bandwidth request information 50 that specifies the total data length of the high priority information and the total data length of the low priority information as the uplink bandwidth to be requested. The bandwidth request information 50 specifies the data length of the high priority information and the data length of the low priority information separately.

The base station BS1 that received the bandwidth request information 50 preferentially allocates the uplink bandwidth to the high priority information requested by each mobile terminal, and transmits the bandwidth acquisition information 51 to the requesting mobile terminal, which is received by the mapping unit 47. In the example of FIG. 15, a total of 192 bytes are allocated as the PDU transmission bandwidth.

The mapping unit 47 preferentially maps the relatively high priority PDU 0 (RRC control instruction) and PDU 1 (email data) stored in the second and third FIFO memories 40b and 40c. Since all of the allocated bandwidth is used up, the PDU 2 (VoIP data) and PDU 3 (SIP message) stored in the fourth and fifth FIFO memories 40d and 40e are not mapped.

In step S56 depicted in FIG. 12, the mapping unit 47 retrieves the preferentially mapped email data from the transmit data storing unit 40, and in step S57, other information such as control information and a header or the like are added to the email data (reference numeral 52 in FIG. 15). In step S58, the thus assembled data is transmitted via the layer 1 (L1) 31 to the base station BS1.

As can be seen from a comparison between FIGS. 10 and 15, the disclosed mobile terminal UE1 can switch the transmission priority between the VoIP data and the email data in such a manner that higher priority which is normally given to the VoIP data is given to the email data in the event of an emergency. In this way, the disclosed mobile terminal UE1 gives higher priority to email transmission which provides more useful means of transmission in the event of an emergency.

The above configuration example has been depicted for illustrative purposes only to facilitate an understanding of the present invention, and is not intended to limit the scope of the present invention. Accordingly, the configuration that determines the transmission priority in accordance with the service type information contained in the transmit data packet can be modified in various ways without departing from the scope of the invention.

For example, rather than storing the mapping table of the bearer IDs and FIFO numbers, the bearer ID database 43 may store bearer IDs and pointers to memory areas where the data corresponding to the respective bearer IDs are stored.

Further, transmission processing of each logical channel may be performed, for example, in a separate task, and the transmission priority of the data transmitted on each logical channel may be changed by changing the priority between the tasks.

Figure 16:
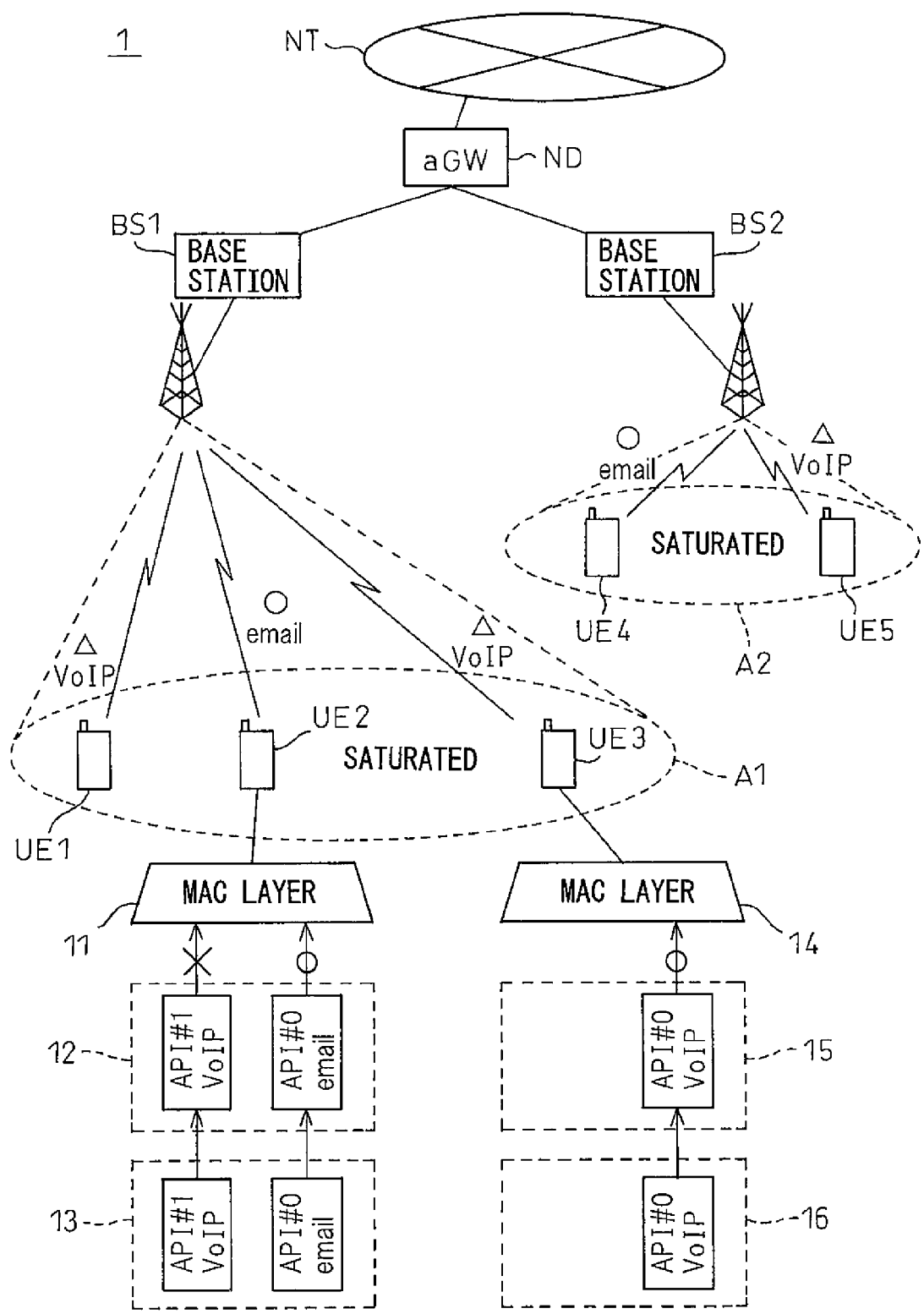
FIG. 16 is a diagram explaining how priority is set in each mobile terminal of the communication system disclosed herein.

FIG. 16 is a diagram explaining how priority is set in each mobile terminal of the communication system 1 in the event of an emergency. In the event of an emergency, the mapping unit 47 gives higher priority to the transmission of email data than the transmission of VoIP data; as a result, in the mobile terminal UE2, priority is given to the transmission of email data.

Further, in the event of an emergency, the bandwidth request information generating unit 48 requests the uplink bandwidth for the transmission of email data with high priority but requests the uplink bandwidth for the transmission of VoIP data with low priority. As a result, when allocating the uplink bandwidth, higher priority is given to the mobile terminals UE2 and UE4 attempting to transmit email data than the mobile terminals UE1, UE3, and UE5 attempting to transmit VoIP data. In this way, even when there are a plurality of mobile terminals within the area covered by the same base station, since priority is given to the transmission of email, the transmission of email can be prevented from being blocked due to congestion of VoIP communication.

In a mobile terminal, a novel means and method are provided that determine the transmission priority of uplink data in accordance with service type.

Accordingly, by adding, for example, a newly provided priority determining means, priority control can be performed that uses different priority in an emergency situation than in a normal situation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that various changes, substitutions, and alterations could be made hereto without departing from the spirit and scope of the invention.

What is claimed is:

1. A mobile station which transmits data to a base station by assembling said data into an Internet protocol packet, comprising a processor and a storage, wherein, first priority information which specifies a correspondence relationship between a plurality of bearer IDs of said uplink channels and their priority respectively, and second priority information which specifies a correspondence relationship between a plurality of service type identifiers that are set in packets on said uplink channels and their priority respectively, are stored in said storage, and said processor is configured to:
detect a state relating to a predetermined condition;
detect said service type identifier from a header of a packet on said uplink channels, at a radio link control layer or a packet data convergence protocol sublayer; and
switch, between said first priority information and said second priority information, priority information used for determining radio resource allocation priority for said each of uplink channels depending on said detected state.

2. A mobile station which transmits data to a base station by assembling said data into an Internet protocol packet, comprising a processor and a storage, wherein,
    first priority information which specifies a correspondence relationship between a plurality of bearer IDs of said uplink channels and their priority respectively, and second priority information which specifies a correspondence relationship between a plurality of service type identifiers that are set in packets on said uplink channels and their priority respectively, are stored in said storage, and
  said processor is configured to:
    detect a state relating to a predetermined condition;
    set service type identifier in a header of a packet on said uplink channel, in such a manner as to correspond with an application that generates data carried in said packet;
    detect said service type identifier from said header of said packet; and
    switch, between said first priority information and said second priority information, priority information used for determining radio resource allocation priority for said each of uplink channels depending on said detected state.

3. A data transmission method for transmitting data to a base station by assembling said data into an Internet protocol packet in a mobile station having a processor and a storage, wherein:
  first priority information which specifies a correspondence relationship between a plurality of bearer IDs of said uplink channels and their priority respectively, and second priority information which specifies a correspondence relationship between a plurality of service type identifiers that are set in packets on said uplink channels and their priority respectively, are stored in said storage;
  a state relating to a predetermined condition is detected by said processor;
  service type identifier is detected from a header of a packet on said uplink channels by said processor, at a radio link control layer or a packet data convergence protocol sublayer; and
  priority information used for determining radio resource allocation priority for said each of uplink channels is switched by said processor, between said first priority information and said second priority information depending on said detected state.

\* \* \* \* \*